(No Model.) 3 Sheets—Sheet 1.
E. A. OVENSHIRE.
PLANTER.
No. 559,401. Patented May 5, 1896.
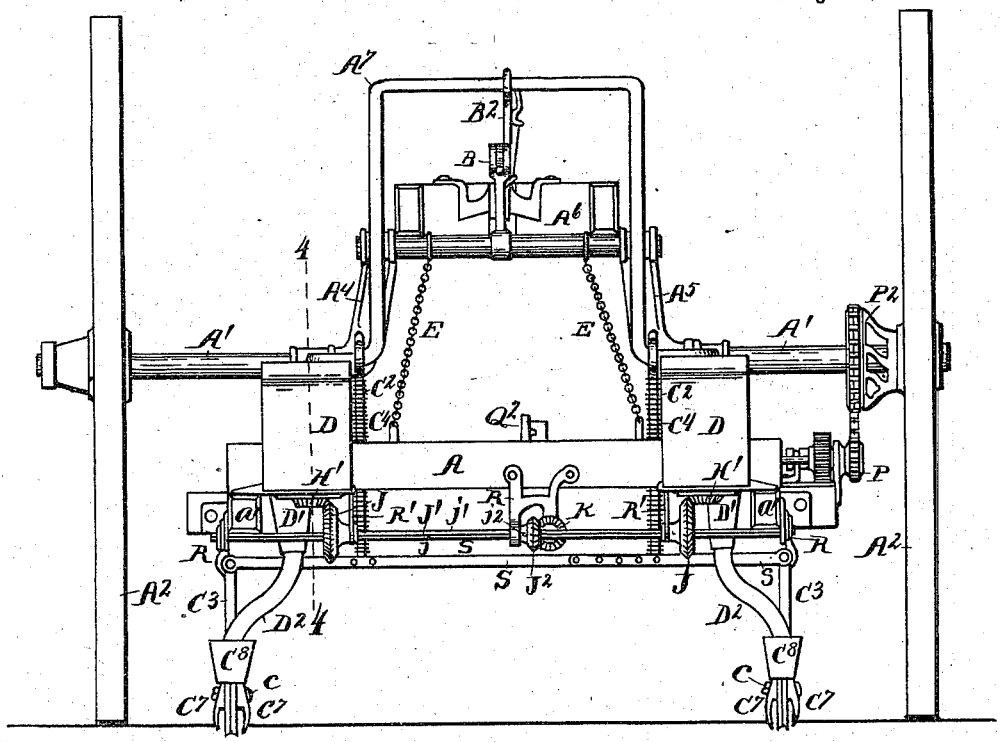
WITNESSES
INVENTOR
Elijah A. Ovenshire
By his Attorney
Newell S. Wright

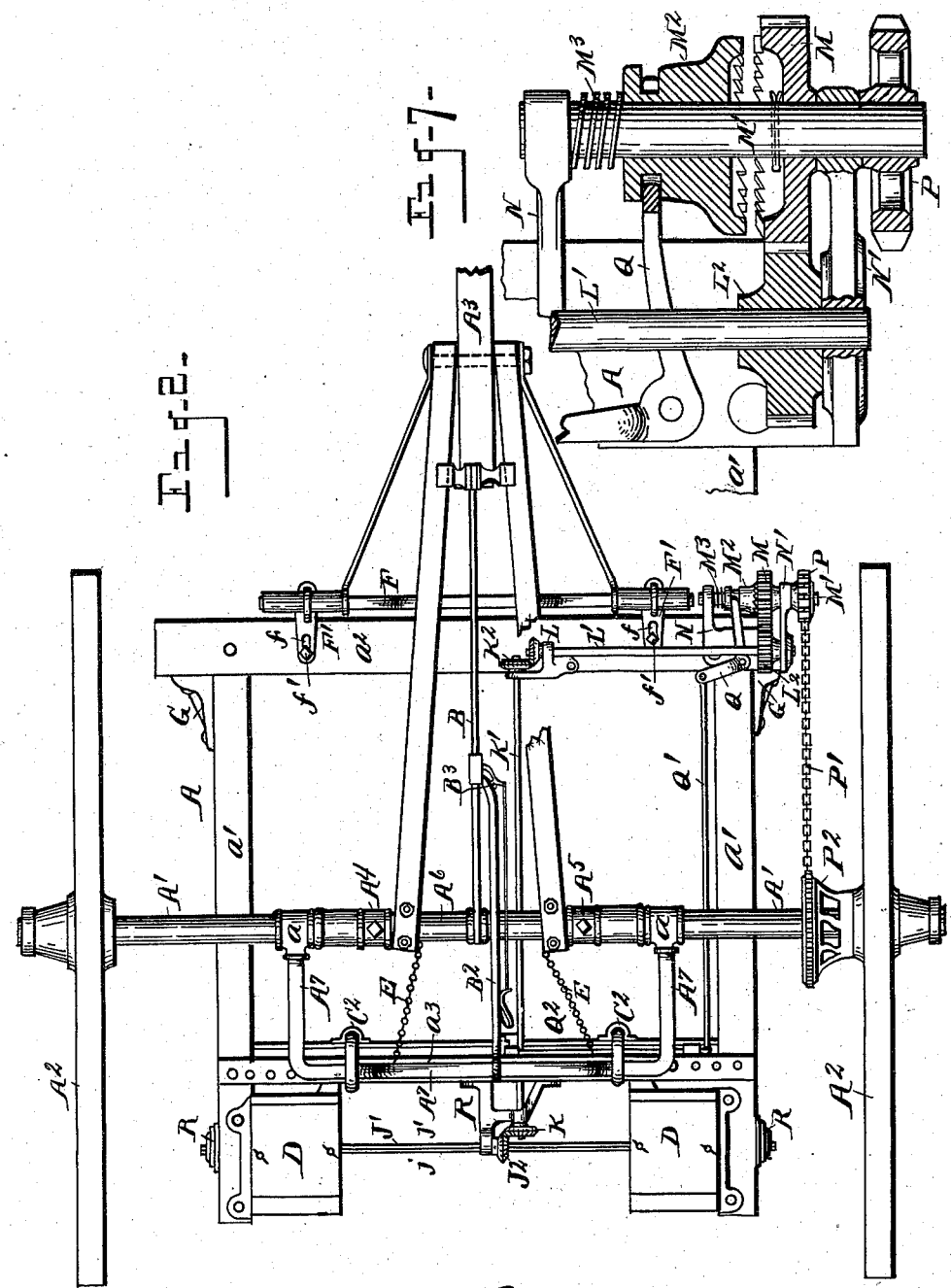

(No Model.) 3 Sheets—Sheet 3.
E. A. OVENSHIRE.
PLANTER.
No. 559,401. Patented May 5, 1896.
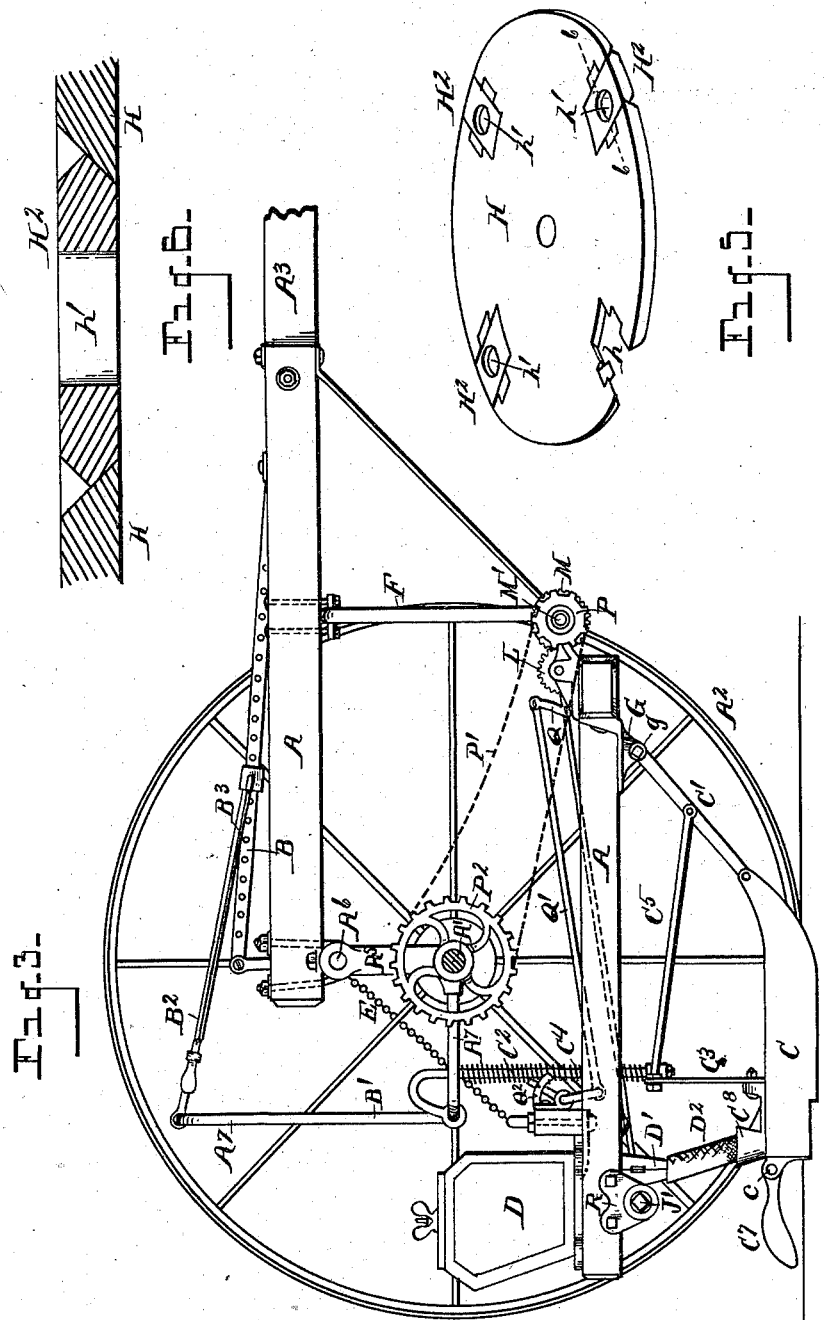
WITNESSES
O. B. Baenziger
Mary A. Martin
INVENTOR
Elijah A. Ovenshire
By his Attorney
Newell S. Wright

UNITED STATES PATENT OFFICE.

ELIJAH A. OVENSHIRE, OF DETROIT, MICHIGAN, ASSIGNOR TO THE AMERICAN HARROW COMPANY, OF SAME PLACE.

PLANTER.

SPECIFICATION forming part of Letters Patent No. 559,401, dated May 5, 1896.

Application filed May 13, 1895. Serial No. 549,070. (No model.)

*To all whom it may concern:*

Be it known that I, ELIJAH A. OVENSHIRE, a citizen of the United States, residing at Detroit, county of Wayne, State of Michigan, have invented a certain new and useful Improvement in Planters; and I declare the following to be a full, clear, and exact description of the invention, such as will enable others skilled in the art to which it appertains to make and use the same, reference being had to the accompanying drawings, which form a part of this specification.

My invention has for its object an improved planter, the same being especially adapted for a corn and bean planter, although my invention contemplates its use for any purpose to which it may be found adapted.

My invention consists of the construction, combination, and arrangement of devices hereinafter described and claimed, and illustrated in the accompanying drawings, in which—

Figure 1 is a rear elevation embodying my invention. Fig. 2 is a plan view. Fig. 3 is a side elevation with one of the wheels removed. Fig. 4 is a view in section on the line 4 4, Fig. 1. Fig. 5 is a detail view of one of the rotating feed-disks in the hoppers. Fig. 6 is a sectional view on the line 6 6, Fig. 5. Fig. 7 is a detail view of the counter-gear and clutch mechanism, partly in horizontal section and partly in plan.

The object of my invention is to provide a machine of this class of superior efficiency, simplicity, and utility.

I carry out my invention as follows:

A represents any suitable framework.

A' is an arched axle.

$A^2$ denotes the wheels, and $A^3$ the tongue.

The axle A' is provided toward the middle thereof with intervening upwardly-extended arms $A^4$ $A^5$, said arms being preferably constructed of metal castings, the upper ends thereof being connected by an intervening connecting-bar or metal tubing $A^6$. The extremities of the metal arms $A^4$ $A^5$ are constructed with orifices to receive the adjacent end portions of the axle A' and the connecting-piece $A^6$. The arms $A^4$ $A^5$ may be secured to the parts A' and $A^6$ in any suitable manner.

$A^7$ is an arched lever extending rearwardly from the axle and then upward, the ends of which are secured upon the axle A', as indicated at $a$.

While I have described the axle A' provided with intervening castings $A^4$ $A^5$, connected by the part $A^6$, said axle might be arched in any desired manner within the scope of my invention to support the rear end of the tongue. Upon the tongue is located a toothed bar B. The upper portion of the lever $A^7$ is provided with a ratchet-arm $B^2$, provided with a spring-pawl $B^3$ to engage the perforations of the bar B.

C denotes the shoes jointedly connected by a bar C' with the forward end of the frame A, said shoes being supported by bars $C^2$ upon the arched lever $A^7$, a connecting-bar $C^3$ intervening between the shoe and the corresponding bar $C^2$. Upon the bars $C^2$, I locate springs $C^4$, arranged to give a downward tension upon the shoes supported by said bars.

$C^5$ is a brace-rod.

It will be evident that by means of the ratchet mechanism above described the upper portion of the arched lever $A^7$ may be forced forward and held in a given position, thereby lifting the shoes, the same operation also lifting the rear of the frame in the manner hereinafter described.

D denotes the hoppers supported upon the frame A. The rear portion of the frame A is flexibly suspended upon the portion $A^6$ of the axle in any suitable manner, as by means of chains E. The forward end of the frame A is supported upon the tongue, as by means of an arch F, with which the frame has a jointed connection by intervening castings or brackets F', said castings preferably made adjustable, as by constructing the same with elongated slots $f$, through which bolts $f'$ unite the castings to the frame. The side bars $a'$ $a'$ of the frame I make laterally adjustable relative to the forward portion $a^2$ of the frame, as by means of adjustable brackets G, bolted to said bars. By simply loosening the bolt connecting said bracket with the bar $a^2$ of the frame the corresponding side bar $a'$ of the frame may be adjusted laterally into the desired position, in which position the bracket may be reëngaged with the bar $a^2$ of the frame. The bar $a^3$ is bolted to the side bars, the bar $a^3$ being provided with a series of bolt-holes at each end, as shown. In this manner the hoppers or feed-boxes D D with their corresponding parts may readily be adjusted laterally, so as to plant the seed any required distance apart. The arms C' unite the forward ends of the shoes C with the corresponding brackets G, as indicated at $g$, so that in adjusting the bars $a'$ $a'$ laterally in connection with the bars $a^2$ and $a^3$ not only the feed boxes or hopper, but also the shoes, are correspondingly adjusted laterally.

D' denotes spouts leading from the corresponding hoppers D, said spouts being provided with a flexible tubing $D^2$ at their lower end, leading into spouts $C^3$, connected with the shoes C, the flexible tubes $D^2$ facilitating the lateral adjustment above mentioned.

At the base of each of the hoppers D is a rotatable feed-disk H, constructed with a beveled geared hub H', projecting through the base of the hopper, said hub meshing with the beveled gear J upon a shaft J', the rotation of the gear J causing the rotation of the disk H. The feed-disk H is shown in detail in Fig. 5. At the periphery thereof said plate is formed with a series of recesses, as indicated at $h$, to receive corresponding plates $H^2$. Said plates may be constructed with or without a feeding orifice or perforation $h'$ therein, through which the seed may be discharged from the hopper. These plates $H^2$, I prefer to have in dovetailed engagement with the disk, as indicated more particularly in Fig. 6, the dovetailed connection of the one with the other being such as to support the plate in position. The feed-disk H is countersunk into the base of the hopper D, by which means the plates $H^2$ will be prevented from sliding outwardly out of place. As many of these plates $H^2$ may be located in the disk H as may be desired.

$H^3$ denotes a cap or cover located above the feed-disk H and held in place in any suitable manner, as by means of a bolt $h^2$, connecting said cap with the base of the hopper. The cap $H^3$ is constructed with an interior chamber $h^3$, in which is located a rotatable toothed seed-ejector $h^4$. The seed-ejector $h^4$, as shown, is simply laid upon the disk H, free to move vertically, to stand still, and to rotate. It does not rotate upon the movement of said disk only when one of the orifices $h'$ in the disk is moved thereunder. By this construction the orifices in the disk and the teeth on the seed-ejector are not required to register. My invention contemplates thus a construction and arrangement of the ejector relative to the cap and disk, whereby the ejector may rise and its teeth be lifted entirely out of any corresponding orifices to permit the plate sliding about thereunder. This permits any of the orifices in the disk being filled up, as may be desired. The cap $H^3$ is constructed with interior vertical channels or grooves, (indicated at $h^6$,) in which the ends of the axis $h^7$ of the toothed seed-ejector are engaged, said grooves or channels forming a guide or way for the extremities of said axis, permitting the vertical movement of the ejector, while at the same time the ejector is held from any movement at right angles to its axis. By this construction the ejector is held firmly in position from any lateral movement, causing a more positive action of the teeth thereof in registering with a given orifice in the disk H. The base of the hopper is constructed with an opening $h^5$, leading into the spout D'. It will be obvious that as the disk H rotates the orifices $h'$ in any of the plates $H^2$ will successively register with the orifice $h^5$. The cap $H^3$ is held stationary in position, the disk H rotating thereunder.

It will be perceived that when the disk H rotates to bring a given perforated plate $H^2$ underneath the cap and the orifice $h'$ registers with the orifice $h^5$ the toothed seed-ejector will be rotated in consequence of one of its teeth dropping into the orifice $h'$, thereby forcing any grain which has lodged in the orifice $h'$ into the spout D'.

The shaft J' is provided intermediate its ends with a gear $J^2$, meshing with a gear K upon a shaft K', extending forwardly to the front end of the frame A, the shaft K' being provided with a gear $K^2$ at its forward end, meshing with a gear L upon a shaft L', extended laterally to a counter-gear at the front end of the machine, the shaft L' being provided with a gear $L^2$, meshing with the counter-gear M. This counter-gear M is loosely mounted on a shaft M', said shaft having its bearings in brackets N and N'. P is a sprocket-gear upon said shaft, upon which a chain P' is engaged, connecting said sprocket-gear P with a sprocket-gear $P^2$ upon the axle A'.

$M^2$ is a clutch engaged upon the shaft M', actuated by a bell-crank Q, fulcrumed upon the frame A, an operating-rod Q' leading from the rear end of the bell-crank to the rear portion of the frame, where the operating-rod is provided with a crank-arm $Q^2$. A spring $M^3$ operates to throw the clutch into engagement with the gear M when the tripping shaft or bar Q' is released.

In order to give the sprocket-chain proper position at all times in the raising and lowering of the frame and in the operation of the machine, it is obviously necessary to carry out the shaft of the counter-gear so that its center will be in line with the center of the journals of the arch F. By making the brackets F' adjustable said journals and shaft may readily be adjusted in line one with the other. The shaft J' is supported in hangers R, engaged with the frame, and in hangers R', engaged with the hoppers. The gear $J^2$ is engaged upon the shaft J' and is held in place in a given position in any suitable manner, as by a set-screw $j^2$.

The shaft J' has a sliding movement through the gears J, the said gears J being held from longitudinal movement upon the shaft between the gear H' on the one side thereof and the hanger R' on the other side thereof. It will thus be apparent that when the frame is adjusted laterally the gears J upon the shaft J' will be correspondingly adjusted, as may be required.

C⁷ denotes the cover-blades at the rear ends of the shoes C, said blades having a jointed connection with the shoes C, as at c.

It will be understood that the adjacent extremities of the axle A' are sleeved in the lower ends of the arms A⁴ A⁵.

S is a bar connecting the bars C³ C³, said bar S extending laterally across the machine underneath the portions a' a' of the frame A. The bar S is preferably constructed of two parts s s, adjustably connected together.

It will be obvious that when the shoes are lifted by means of the arched lever A⁷ being tilted forward the bar S will also be lifted into contact with the frame A, when the further lifting of the bar S with the shoes will also cause the rear end of the frame A to be raised, together with the shoes, a desired height, the shoes being first lifted independently of the frame until the bar S comes into contact with the frame, when both the shoes and the frame will thereafter be simultaneously raised. In lowering the shoes it will be perceived that the frame and the shoes will both be simultaneously lowered until the frame is held from further descent by the chains E, the shoes being free to still further descend independently of the frame, the springs c⁴ upon the bars C² tending to force the shoes firmly downward and to hold them down into the soil.

By making the slides H² in the feed-disks removable slides with any desired size of perforations therein may readily be interchanged in the feeding-disks for different kinds of seed to be planted. So also solid or unperforated slides may be inserted into the disks at any of the recesses where it is desired to plant the seed less frequently or farther apart. If the rotation of the disk H, having perforated slides in all the four recesses h, (shown in the drawings,) plants the seed every foot, for example, then by inserting an unperforated slide in every alternate recess the seed might be planted two feet apart and without removing the feeding-disk, and so on.

By constructing the disk with a sufficient number of recesses and feeding-plates the device may constitute a drill.

What I claim as my invention is—

1. In a planter, the combination of the frame, the shoes, and means to raise and lower the frame and shoes whereby the shoes may be raised and lowered a given distance independently of the frame, substantially as set forth.

2. In a planter, the combination of an axle, a frame flexibly supported on the axle, the shoes, and means to raise and lower the frame and the shoes whereby the shoes may be raised and lowered independently of the frame below the point of suspension of the frame upon said flexible support, substantially as set forth.

3. In a planter, the combination of an axle arched intermediate its ends to support the tongue and provided with an arched lever A⁷, a flexible support connecting the frame with the arch supporting the tongue, shoes supported upon said arched lever, said arched lever made oscillatory whereby the frame and shoes may be raised and lowered, and means to hold the arched lever in a given position, substantially as set forth.

4. In a planter, the combination of the frame, the shoes, the arched lever, connections uniting the shoes with the arched lever, a bar S uniting said connections beneath said frame, said arched lever made oscillatory to raise and lower the frame and the shoes, and means to hold the arched lever in a given position, substantially as set forth.

5. In a planter, the combination of a tilting frame, hoppers carried by said frame, the shoes, and means to raise and lower the rear end of the frame and the shoes, whereby the shoes may be raised and lowered a given distance independently of the frame, substantially as set forth.

6. In a planter, the combination of a frame, hoppers supported thereon provided with rotatable feed-disks, a geared shaft L' geared with the counter-gear, a shaft K' geared with the shafts J' and L', a spring-actuated clutch to engage said counter-gear, sprocket mechanism to drive said clutch, a bell-crank Q to throw the clutch out of operation, an operating-rod Q' connected with said bell-crank, said rod provided with a crank-arm Q², substantially as set forth.

7. In a planter, a hopper provided with a rotatable feed-disk having a series of recesses at its periphery, slides H² having a dovetailed engagement in said recesses, said feed-disk countersunk in the base of the hopper, said slides being interchangeable, substantially as set forth.

In testimony whereof I sign this specification in the presence of two witnesses.

ELIJAH A. OVENSHIRE.

Witnesses:
N. S. WRIGHT,
M. A. MARTIN.